(12) United States Patent
Wong et al.

(10) Patent No.: US 7,648,092 B2
(45) Date of Patent: Jan. 19, 2010

(54) FOOD GRATER

(75) Inventors: Clive Koon Yin Wong, San Leandro, CA (US); Williard Wing Yin Wong, San Leandro, CA (US); Yiu Chung Wan, Hong Kong (HK)

(73) Assignee: Kwok Kuen So, Hong Kong (HK)

( * ) Notice: Subject to any disclaimer, the term of this patent is extended or adjusted under 35 U.S.C. 154(b) by 301 days.

(21) Appl. No.: 11/676,079

(22) Filed: Feb. 16, 2007

(65) Prior Publication Data

US 2007/0215729 A1    Sep. 20, 2007

(51) Int. Cl.
*A47J 17/00* (2006.01)
*A47J 43/00* (2006.01)

(52) U.S. Cl. ............ 241/169; 241/273.2; 100/98 R; 100/234

(58) Field of Classification Search ............ 241/94, 241/273.2, 169; 100/234, 110, 98 R
See application file for complete search history.

(56) References Cited

U.S. PATENT DOCUMENTS

| | | | | |
|---|---|---|---|---|
| 696,204 A | * | 3/1902 | Silver | 241/84.3 |
| 751,159 A | * | 2/1904 | Gage | 241/169 |
| 774,217 A | * | 11/1904 | Welke | 241/273.1 |
| 775,973 A | * | 11/1904 | Hibbard | 241/169 |
| 1,399,708 A | * | 12/1921 | Ferdon | 241/84.3 |
| 3,195,598 A | * | 7/1965 | Koch | 241/168 |
| 5,924,636 A | * | 7/1999 | Calderon | 241/84.3 |
| 6,974,098 B2 | * | 12/2005 | Keller | 241/169 |
| 7,017,843 B2 | * | 3/2006 | Romano | 241/169 |
| 7,293,502 B2 | * | 11/2007 | So | 100/234 |
| 7,296,762 B2 | * | 11/2007 | Dorion | 241/169 |

FOREIGN PATENT DOCUMENTS

EP    1417919 A1    5/2004

* cited by examiner

*Primary Examiner*—Bena Miller
(74) *Attorney, Agent, or Firm*—William J. Sapone; Coleman Sudol Sapone P.C.

(57) ABSTRACT

A food grater (10) is disclosed as including a first arm (12) and a second arm (14), the first arm (12) including a grating plate (18), the second arm (14) including a wall (23) and a press plate (36) for confining movement of food, and the first arm (12) and second arm (14) are engaged with each other and pivotable relative to each other to grate the food by the grating plate (18).

16 Claims, 9 Drawing Sheets

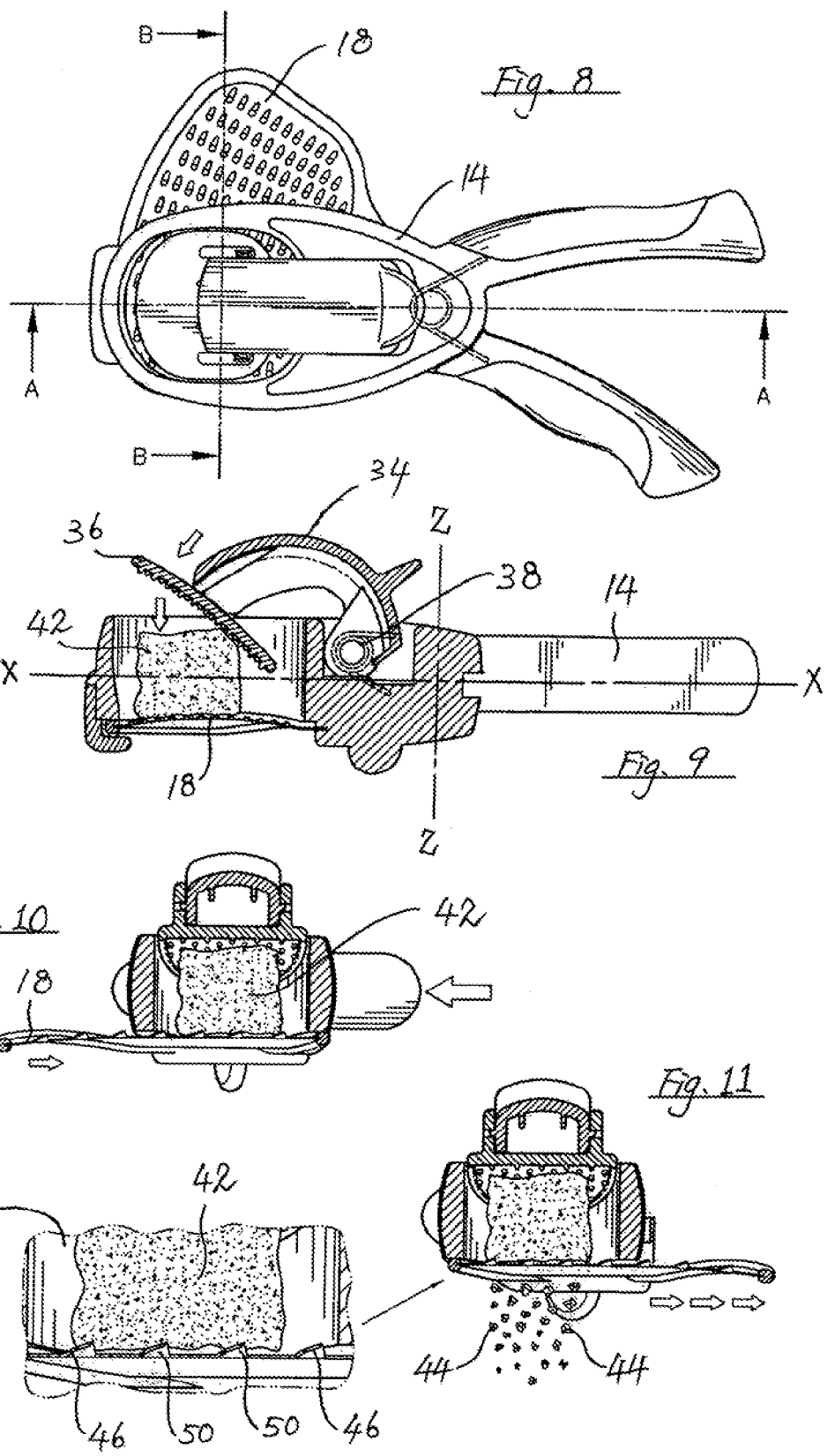

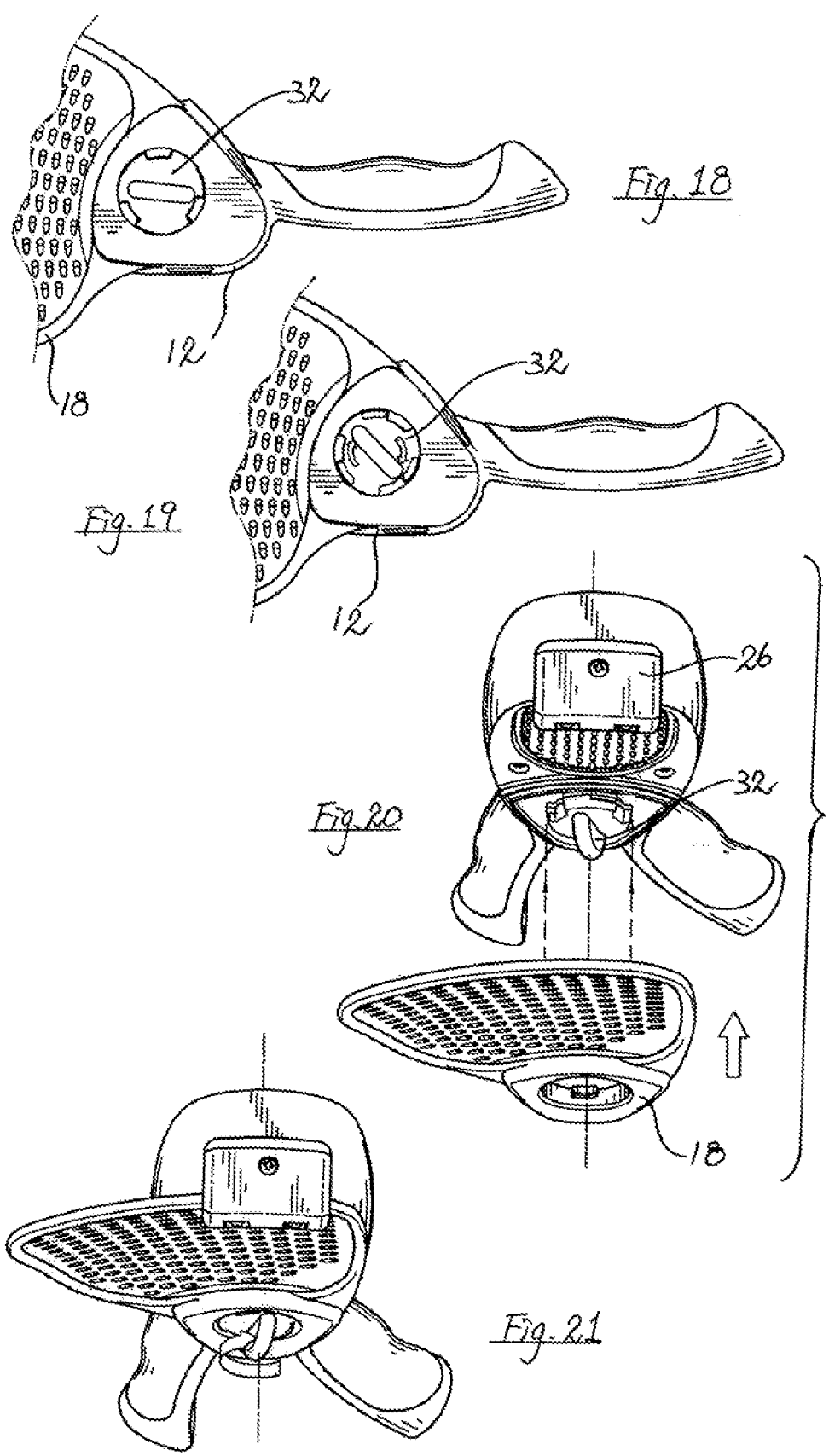

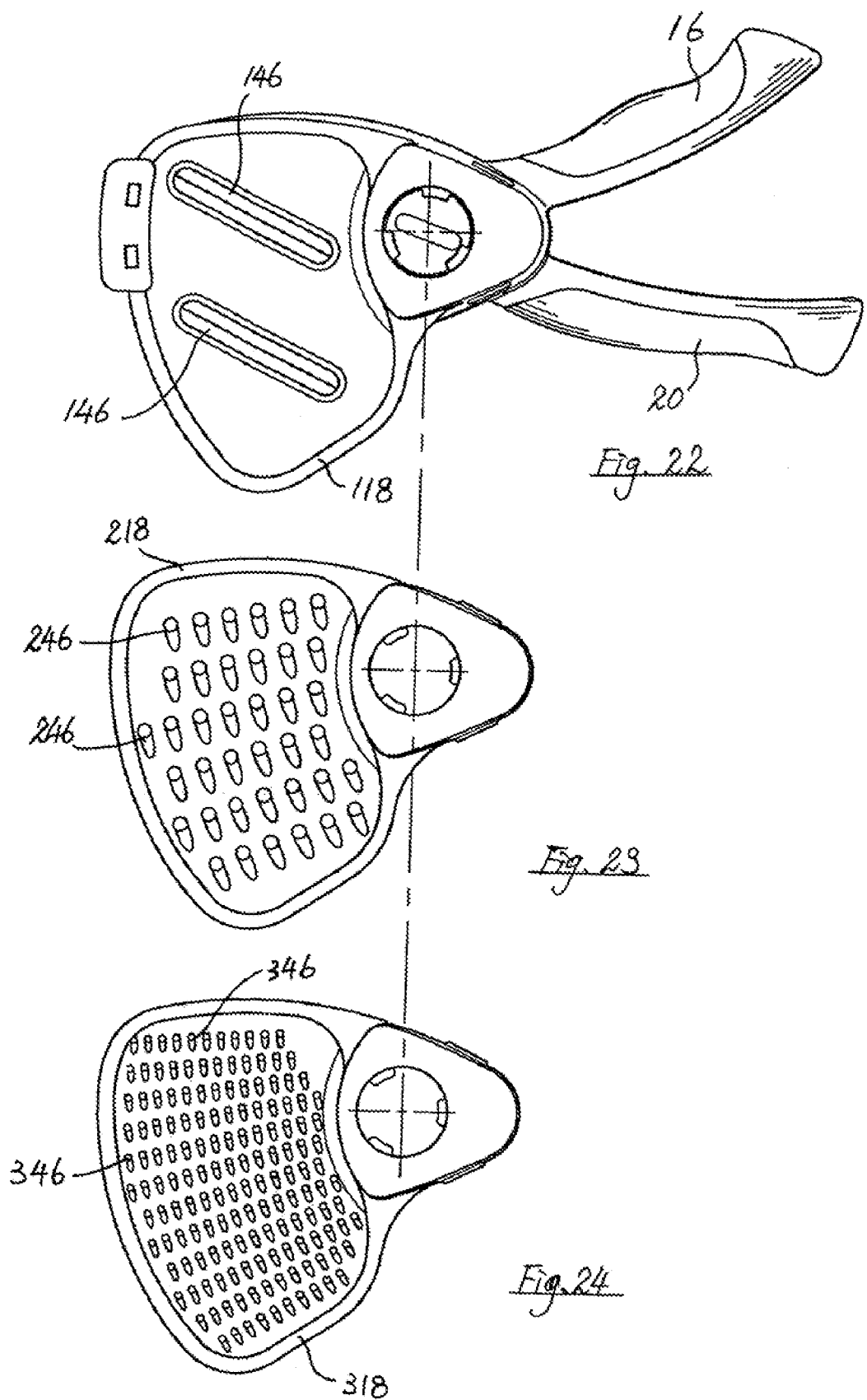

FOOD GRATER

This invention relates to a food grater, e.g. a cheese grater, for holding and grating food items.

BACKGROUND OF INVENTION

One type of existing cheese graters is in the shape of a plate with a number of grating teeth. When grating, a user holds the cheese with one hand and rubs the cheese across the surface of the plate. In addition to having the chance of contaminating the cheese, the user may also accidentally hurt his/her hand during the grating process. It is also not suitable for serving food to guests, whether in a restaurant or at home.

In a second type of existing cheese graters, a grating cylinder is provided on which a cheese is placed. A hand of a user presses on the cheese while another hand of the user rotates a handle to rotate the grating cylinder, to thereby grate the cheese. Similarly, the cheese may be contaminated by germs carried by the hand of the user. It is also inconvenient to use such a cheese grater when serving guests.

A further shortcoming common to both of these conventional cheese graters is that they can be operated only by rising both hands. If, or any reason, the user can only use one hand when serving cheese, neither of these conventional cheese graters is appropriate.

It is thus an object of the present invention to provide a food grater in which the aforesaid shortcomings are mitigated, or at least to provide a useful alternative to the trade and public.

SUMMARY OF THE INVENTION

According to the present invention, there is provided a food grater including a first arm member and a second arm member wherein said first arm member includes a grating member, wherein said second arm member includes means for confining movement of food, and wherein said first arm member and said second arm member are engaged with each other and pivotable relative to each other to grate said food by said grating member.

BRIEF DESCRIPTION OF THE DRAWINGS

A preferred embodiment, of the present invention will now be described by way of example only, with reference to the accompanying drawings, in which:

FIG. 8 is a further top view of the cheese grater of FIG. 1;

FIG. 9 is a sectional view taken along the line A-A of FIG. 8;

FIG. 10 is a sectional view taken along the line B-B of FIG. 8;

FIG. 11 is a further sectional view similar to FIG. 10, but with the cheese grater in a different configuration;

FIG. 12 is an enlarged view of part of FIG. 11;

FIG. 18 is a partial bottom view of the arm with the grating plate with a lock in a first position;

FIG. 19 corresponds to FIG. 18 with the lock in a second position;

FIG. 20 is a front bottom exploded perspective view showing the grating plate and the cheese grater of FIG. 1;

FIG. 21 is a front bottom perspective view showing the grating plate as engaged with the cheese grater;

FIG. 22 is a bottom view of the cheese grater of FIG. 1, engaged with a second exemplary grating plate;

FIG. 23 is a bottom view of a third exemplary grating plate; and

FIG. 24 is a bottom view of a fourth exemplary grating plate.

DETAILED DESCRIPTION OF THE PREFERRED EMBODIMENT

Figure 1:
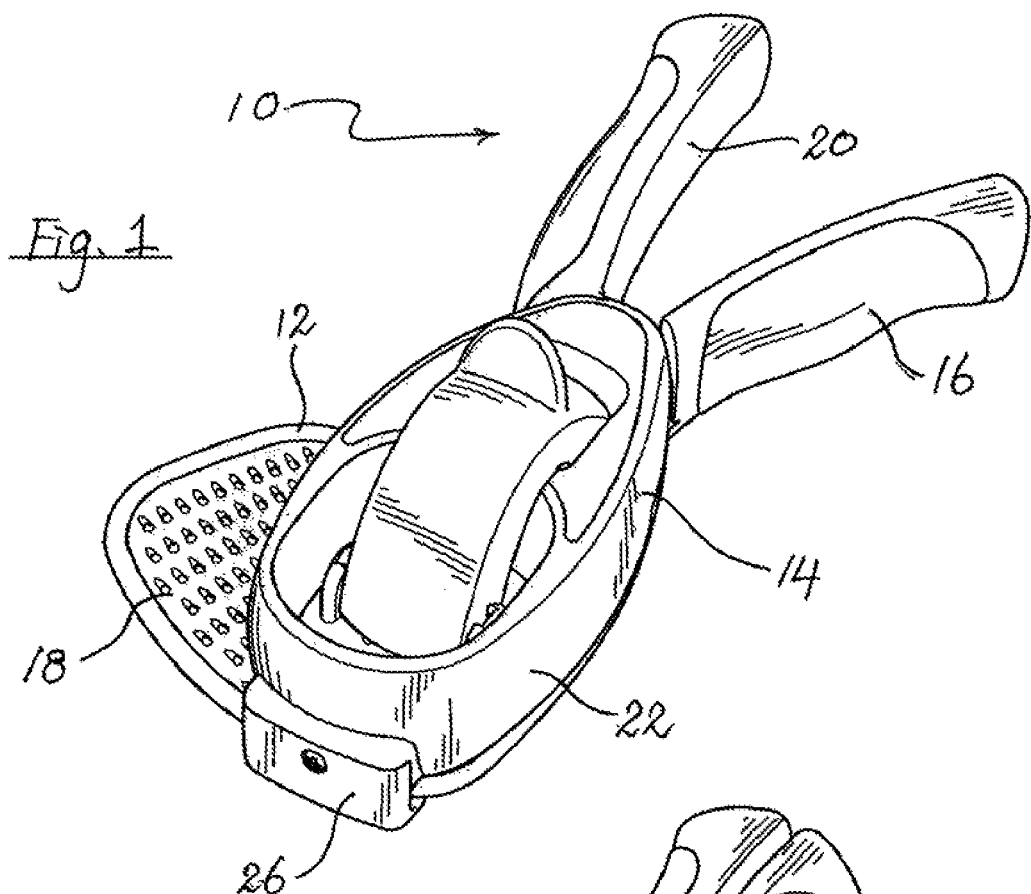
FIG. 1 is a top perspective view of a cheese grater according to a preferred embodiment of the present invention, in a first configuration.

A cheese grater according to an embodiment of the present invention is shown in FIGS. 1 to 4, and generally designated as 10. The cheese grater 10 includes two arms 12, 14 which are engaged with each other for relative pivotal movement, similar to that of a pair of pliers. More particular, the two arms 12, 14 are pivotable relative to each other about an axis Z-Z which is perpendicular to the longitudinal x-x of the arm 14. The axis Z-Z is also perpendicular to the longitudinal axis of the arm 12.

The arm 12 includes a handle 16 and a grating plate 18 which are releasably attached with each other. As to the arm 14, such includes a handle 20 and a front portion 22 which includes an upstanding wall 23 defining a bottomless through hole 24 for containing the food, e.g. a lump of cheese, to be grated. It can be seen that the upstanding wall 23 confines, but not necessarily totally prevents, the movement of the food within the through hole 24. An end piece 26 is fixed to the end of the front portion 22 of the arm 14 for supporting the grating plate 18 for operation.

Figure 2:
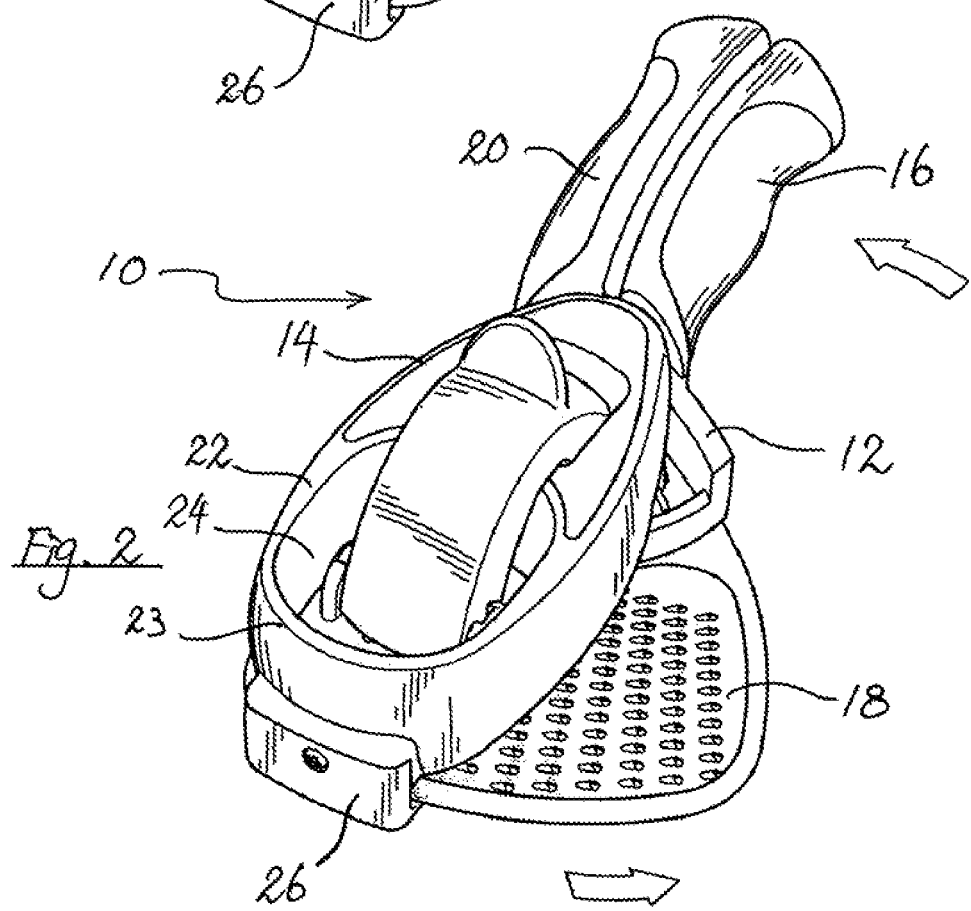
FIG. 2 is a top perspective view of the cheese grater of FIG. 1 in a second configuration.
Figure 3:
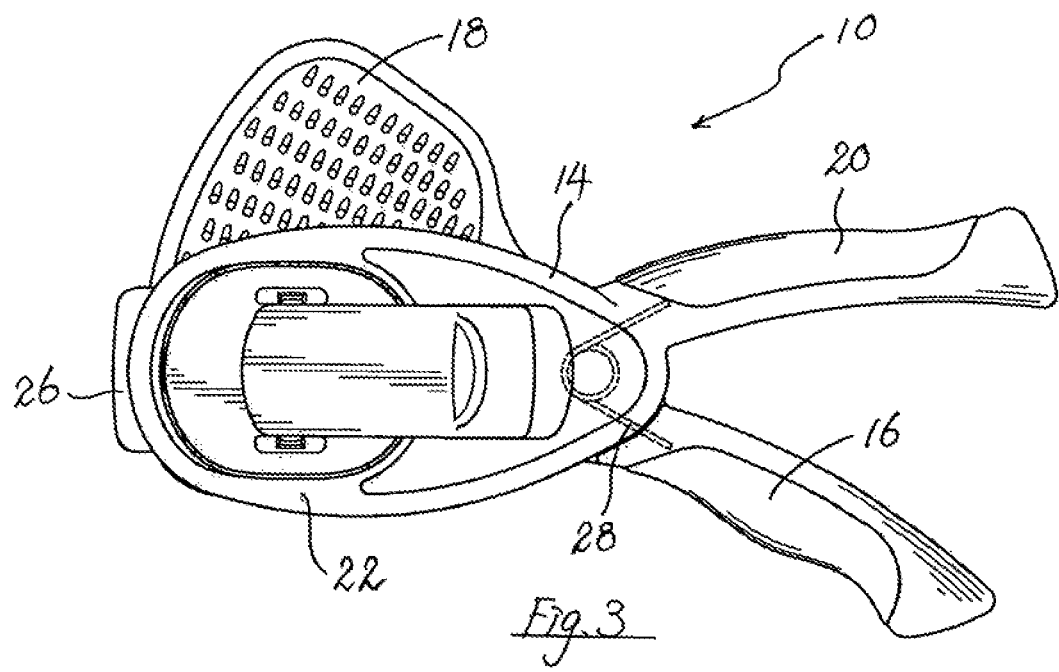
FIG. 3 is a top view of the cheese grater of FIG. 1.
Figure 4:
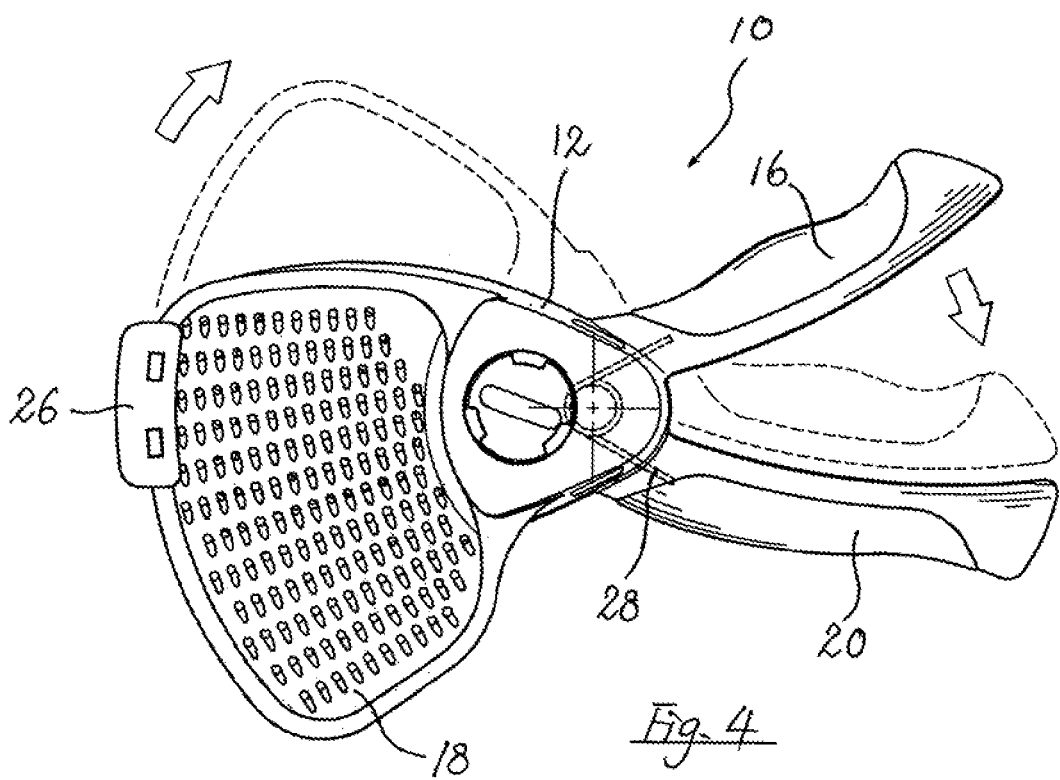
FIG. 4 is a bottom view of the cheese grater of FIG. 1.

As can be seen in FIGS. 1 to 4, the two arms 12, 14 may be pivoted relative to each other, in a manner similar to the operation of a pair of pliers, or a pair of scissors, to move the arms 12, 14 between the two configurations as shown in FIGS. 1 and 2 respectively. As can be seen in FIGS. 1 to 4, during such movement, the grating plate 18 is pivoted relative to underside of the through hole 24 of the arm 14 to grate the food in the through hole 24. A spring 28 (shown in dotted line in FIGS. 3 and 4) biases the arms 12, 14 to the configuration as shown in FIGS. 1 and 3, in which the handles 16, 20 are furthest away from each other. The arms 12, 14 may be brought to the configuration shown in FIG. 2, by pressing the two handles 16, 20 together, against the biasing force of the spring 28. Upon release of the pressing force on the handles 16, 20, the spring 28 will bias the arms 12, 14 back to the configuration as shown in FIGS. 1 and 3.

Figure 5:
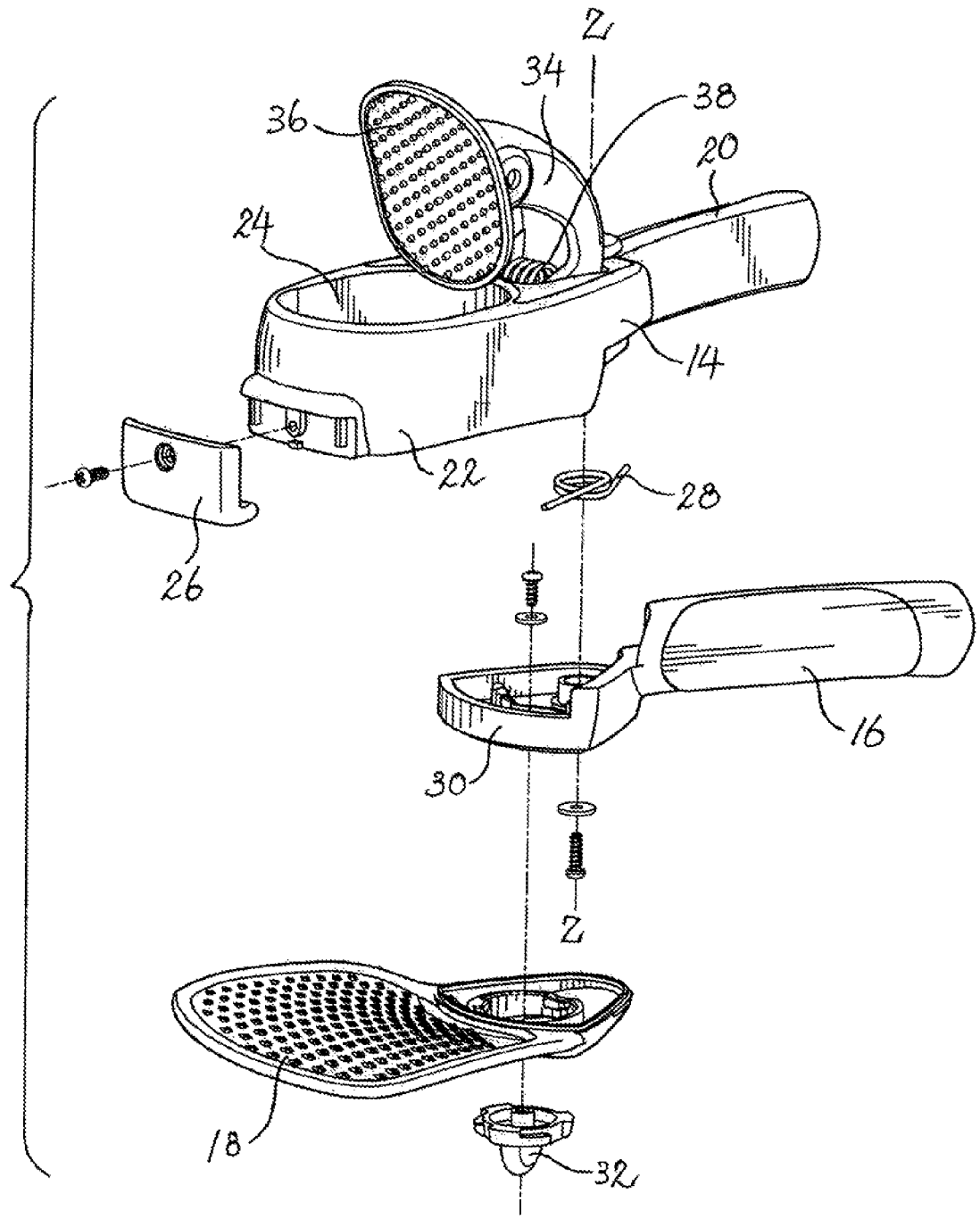
FIG. 5 is an exploded perspective view of the cheese grater of FIG. 1.

As shown in FIG. 5, the grating plate 18 is releasably engaged with a connecting portion 30 of the handle 16 by a lock 32, in a manner to be further discussed below. A curved leg 34 is engaged with the arm 14 for swiveling movement about an axis which is perpendicular to the axis Z-Z. A free end of the leg 34 is engaged with a press plate 36 with a lower surface for abutting the food item to be grated, which also assists in confining movement of the food within the through hole 24. The leg 34 is engaged with the press plate 36 via a spindle to allow the press plate 36 to swivel relative to the leg 34. A spring 38 is provided at the position where the leg 34 is engaged with the arm 14 for biasing the leg 34 and press plate 36 to the position as shown in FIGS. 1 and 2, in which the press plate 36 is wholly received within the through hole 24.

Figure 6:
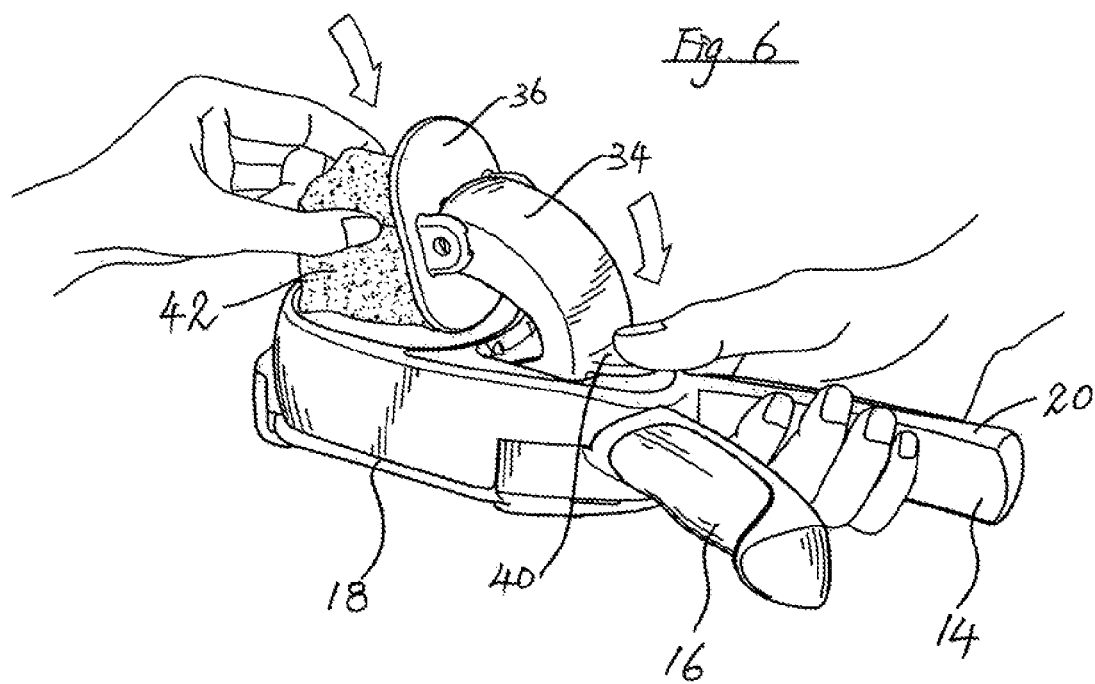
FIG. 6 is a perspective view showing positioning of a lump of cheese in the cheese grater of FIG. 1.
Figure 7:
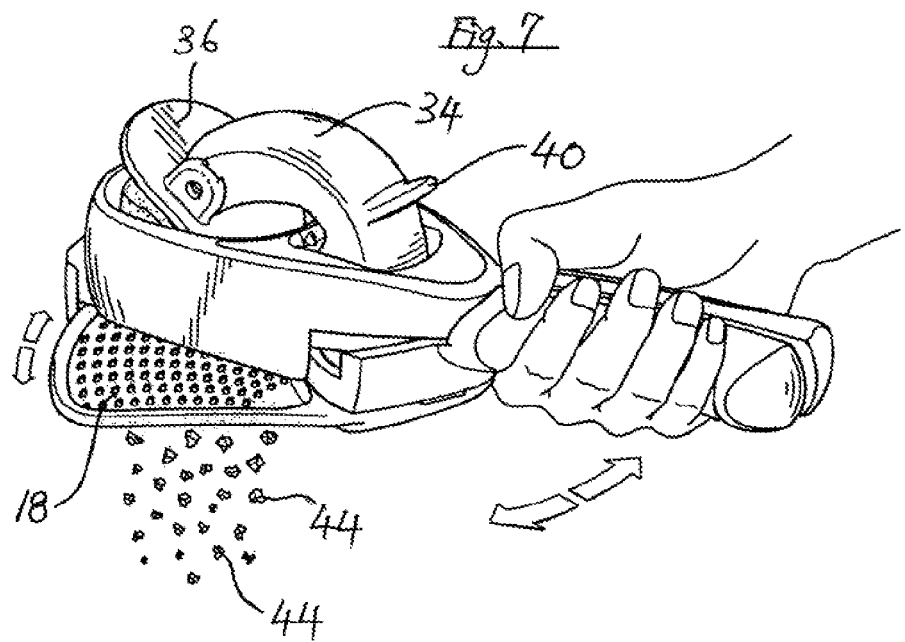
FIG. 7 shows operation of the cheese grater of FIG. 1 for grating a lump of cheese.

As shown in FIGS. 6 and 7, a user may hold the handle 20 of the arm 14 and pivot the leg 34 by pressing an extension 40 of the leg 34 to raise the press plate 36 out of and clear of the through hole 24, against the biasing force of the spring 38. A piece of food, e.g. a lump of cheese 42, may be positioned in the through hole 24 and be supported by the grating plate 18. Upon release of the force on the extension 40, the biasing force of the spring 38 will bias the press plate 36 to press on the lump of cheese 42 against the grating plate 18. The user may then use a single hand to hold the handles 16, 20, as shown in FIG. 18, and cause the arms 12, 14 to pivot relative to each other, similar to the movement of the arms of a pair of pliers, so as to cause the grating plate 18 to grate the underside of the lump of cheese 42. Grated cheese particles 44 may then fall through holes 50 around teeth 46 of the grating plate 18. It can be seen that only one hand is required to operate the cheese grater 10, and it is not necessary to hold the cheese 42 by a hand of the user.

As shown in FIGS. 8 to 12, and in particular in FIGS. 10 and 11, during the relative movement between the grating plate 18 and the arm 14, grating teeth 46 of the grating plate 18 grate the underside of the lump of cheese 42, and holes 50 adjacent the grating teeth 46 allow the grated cheese particles 44 to fall through. It can also be seen that during operation of the cheese grater 10, the lump of cheese 42 is contained in the through hole 24 and supported by the grating plate 18.

Figure 13:
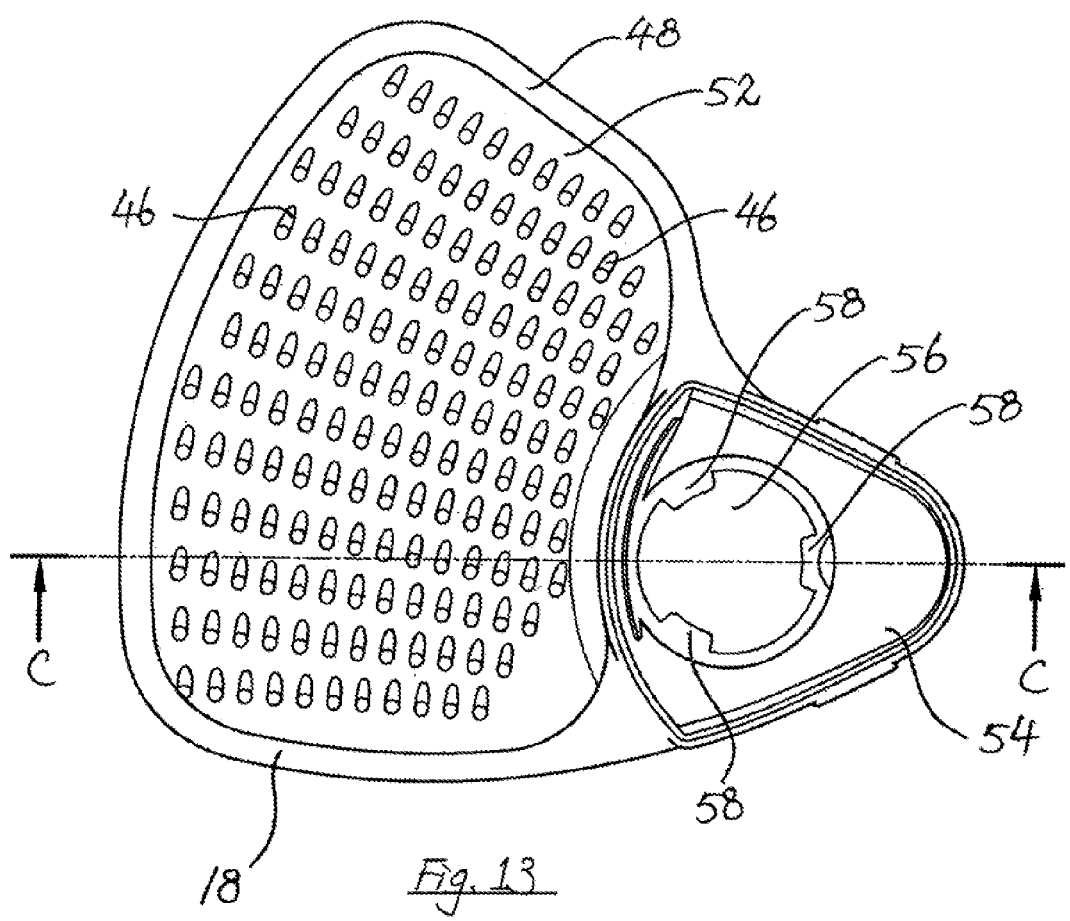
FIG. 13 is a top view of a first exemplary grating plate of the cheese grater of FIG. 1.
Figure 14:
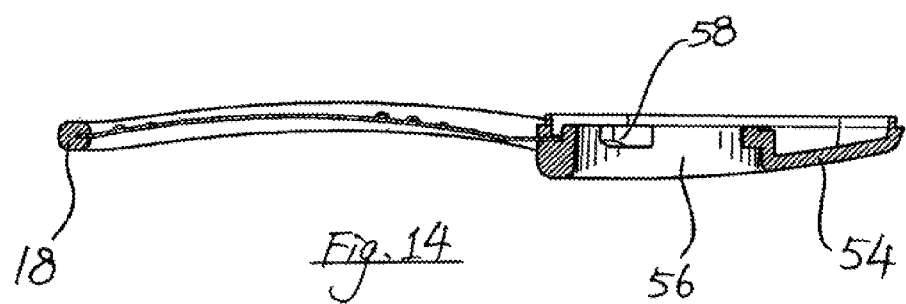
FIG. 14 is a sectional view taken along the line C-C of FIG. 13.

As shown in FIGS. 13 and 14, the grating plate 18 has an outer periphery 48 surrounding an inner plate 52 provided with a number of grating teeth 46. The plate 18 also has a head portion 54 with a hole 56 provided with three arcuate extensions 58 for locking purpose, to be further discussed below.

Figure 15:
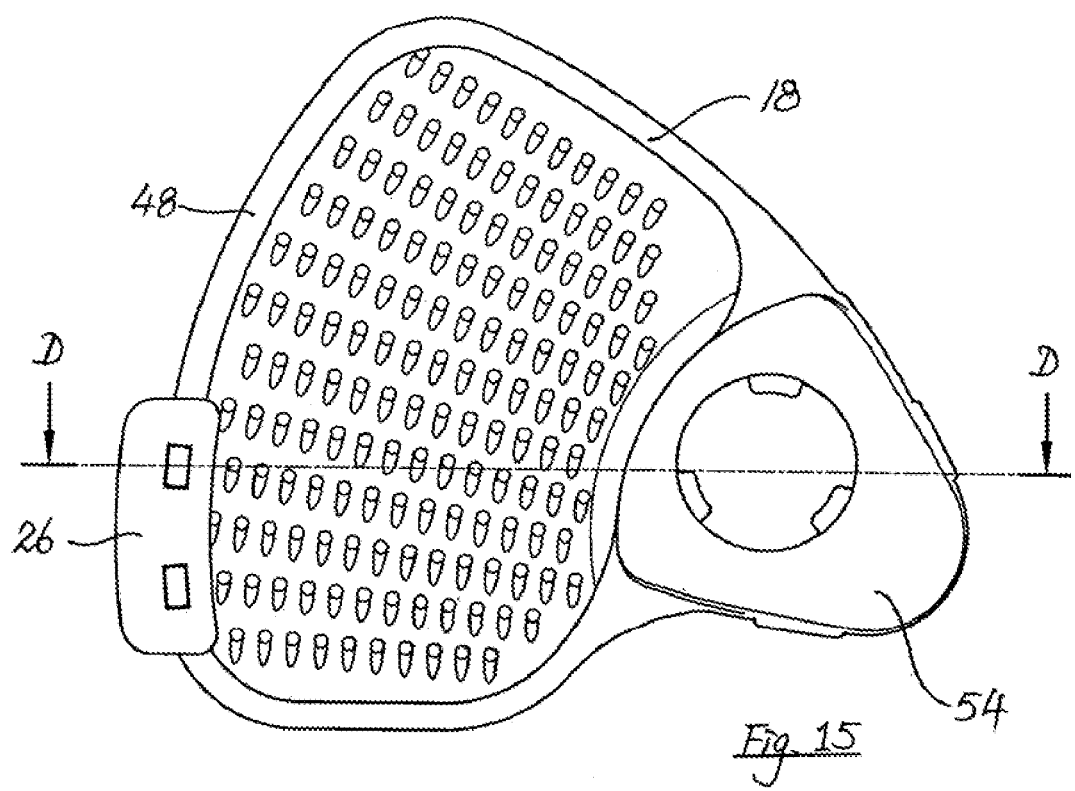
FIG. 15 is a bottom view of the grating plate of FIG. 13 as supported by an end piece.
Figure 16:
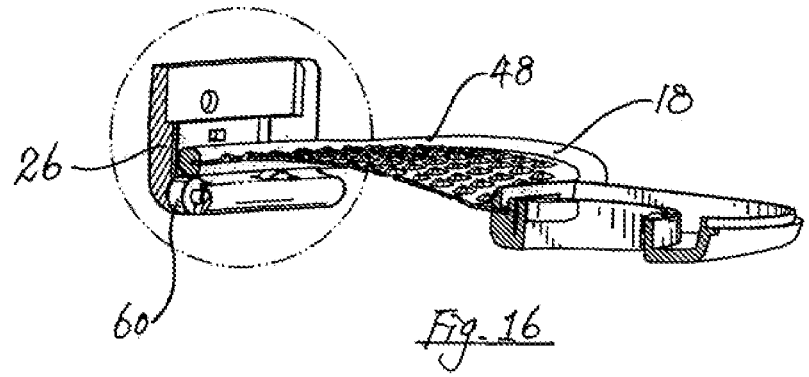
FIG. 16 is sectional perspective view taken along the line D-D.
Figure 17:
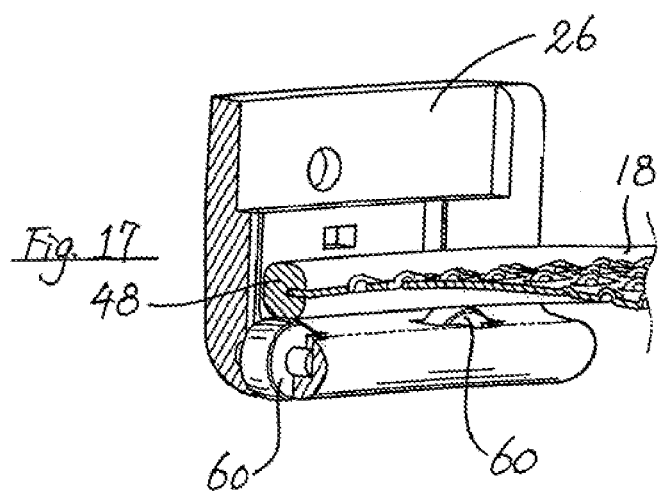
FIG. 17 is an enlarged view of the part encircled in FIG. 16.

As can be seen in FIGS. 15 to 17, a distal end of the periphery 48 of the plate 18 is supported by two rollers 60 carried by the end piece 26, to support the grating plate 18 and to enhance the relative pivoting movement between the grating plate 18 and the end piece 26 of the arm 14.

As shown in FIGS. 18 and 19, the lock 32 may be moved between the position as shown in FIG. 19 in which the grating plate 18 is fixed to the arm 12, and the position as shown in FIG. 19 in which the grating plate 18 may be detached from the arm 12, e.g. for cleaning purpose. Similarly, and as shown in FIGS. 20 and 21, when the lock 32 is in the position shown in FIG. 20, the grating plate 18 may be attached to the grater 10, and when the lock 32 is subsequently turned in the direction of the arrow shown in FIG. 21, the grating plate 18 is fixedly engaged with the grater 10.

With the feature of detachable engagement of the grating plate 18 with the arm 12, different grating plates may be selectively engaged with the grater 10 to suit different purposes. As shown in FIG. 22, a grating plate 118 with two long cutting slots 146 may be secured with the arm 12 for providing slices of cheese. As shown in FIGS. 23 and 24, grating plates 218, 318 with grating teeth 246, 346 of different sizes may be provided for cutting out cheese particles of different sizes.

It should be understood that although the food grater according to the present invention has thus far been discussed in the context of a cheese grater, it should be readily understood by persons skilled in the art that such could be used in the grating of other food items, e.g. carrot, cucumber, garlic, etc.

It should be understood that the above only illustrates an example whereby the present invention may be carried out, and that various modifications and/or alterations may be made thereto without departing from the spirit of the invention.

It should also be understood that various features of the invention which are, for brevity, described here in the context of a single embodiment, may be provided separately or in any appropriate sub-combinations.

The invention claimed is:

1. A food grater including a first arm member and a second arm member, wherein said first arm member includes a grating member, wherein said second arm member includes means for confining movement of food, wherein said first arm member and said second arm member are engaged with each other and pivotable relative to each other to grate said food by said grating member, and wherein said first arm member includes a lock member movable between a first position in which said grating member is fixedly engaged with said first arm member and a second position in which said grating member is detachable from said first arm member.

2. A food grater according to claim 1 wherein said grating member is generally planar with a plurality of grating elements.

3. A food grater according to claim 2 wherein a surface of said grating member supports said food during operation.

4. A food grater according to claim 1 wherein a surface of said grating member supports said food during operation.

5. A food grater according to claim 4 including means for biasing said food towards said grating member.

6. A food grater according to claim 5 wherein said biasing means includes a leg member and a plate member which is adapted to abut said food.

7. A food grater according to claim 6 wherein said leg member and said plate member are swivellable relative to each other.

8. A food grater according to claim 6 wherein said means for confining movement of food has a cavity and said plate member is movable between a first position in which at least part of said plate member is within said cavity and a second position in which said plate member is clear of said cavity.

9. A food grater according to claim 8 wherein said plate member is biased towards said first position.

10. A food grater according to claim 1 wherein said first arm member is releasably engaged with said grating member.

11. A food grater according to claim 1 wherein each of said first arm member and second arm member includes a respective handle portion, said handle portions being adapted to be held by a hand of a user.

12. A food grater according to claim 1 wherein said confining means includes a wall member.

13. A food grater according to claim 1 wherein said confining means includes a plate member.

14. A food grater according to claim 1 wherein said first arm member and second arm member are pivotable relative to each other about an axis which is substantially perpendicular to a longitudinal axis of said first arm member.

15. A food grater including a first arm member and a second arm member, wherein said first arm member includes a grating member, wherein said second arm member includes means for confining movement of food, wherein said first arm member and said second arm member are engaged with each other and pivotable relative to each other to grate said food by said grating member, and wherein at least part of an end of said grating member is supported by at least one roller.

16. A food grater according to claim 15 wherein said at least one roller is carried by an end piece fixedly engaged with said second arm member.

* * * * *